73-151·5 CROSS REFERENCE SEARCH ROOM

DON C. ALLRED
JERALD H. BARTLEY
INVENTORS

BY C. W. Coffee
Atty.

DON C. ALLRED
JERALD H. BARTLEY
INVENTORS
BY C. W. Coffee
Atty.

DRILLING RATE RECORDING

DON C. ALLRED
JERALD H. BARTLEY
INVENTORS

BY C. M. Coffee
Atty.

INVENTORS
DON C. ALLRED
JERALD H. BARTLEY
BY C. M. Coffee
Atty.

DON C. ALLRED
JERALD H. BARTLEY
*INVENTORS*

BY C. W. Coffee
Atty.

DRILLING RATE RECORDING

Filed Oct. 23, 1961 9 Sheets-Sheet 6

DON C. ALLRED
JERALD H BARTLEY
*INVENTORS*

BY C. W. Koffee
Atty.

DON C ALLRED
JERALD H BARTLEY
INVENTORS

BY C. W. Coffee
Atty.

Oct. 27, 1964 D. C. ALLRED ETAL 3,154,367

DRILLING RATE RECORDING

Filed Oct. 23, 1961 9 Sheets-Sheet 8

DON C. ALLRED
JERALD H. BARTLEY
*INVENTORS*

BY C. M. Coffee [signature]
Atty.

Oct. 27, 1964 D. C. ALLRED ETAL 3,154,367

DRILLING RATE RECORDING

Filed Oct. 23, 1961 9 Sheets-Sheet 9

DON C. ALLRED
JERALD H. BARTLEY
INVENTORS

BY C. W. Coffee
Atty.

United States Patent Office 3,154,367
Patented Oct. 27, 1964

3,154,367
DRILLING RATE RECORDING

Don C. Allred and Jerald H. Bartley, both of
510 Midland Savings Bldg., Midland, Tex.

Filed Oct. 23, 1961, Ser. No. 147,710
11 Claims. (Cl. 346—33)

This invention relates to recording instruments for drilling operations and more particularly to recorders which record the time rate of penetration of the drill bit in drilling wells.

This application is a continuation-in-part of our previous application field on the 11th day of July 1960, and given Serial No. 42,016, now abandoned.

Recorders are commercially available from which the time rate of penetration may be calculated. Such recorders have a paper moved at a constant time rate; and, at each foot of depth, a mark is made on the paper. The time rate may be calculated from the frequency of the foot marks.

For geological correlation and interpretation, it is desirable to have a chart prepared so that the abscissa is related to the depth of the well and so that the ordinate is related to the drilling time per unit depth. To obtain such a chart, equipment such as is disclosed in the U.S. Patent to Ramsey, No. 2,638,671, has been designed.

Desirably, the initial chart is made in the final form. As yet, no recorders are commercially available because of the severe requirements of equipment to be used on oil well drilling rigs. Specifically, the equipment should be ruggd so that it is dependable in operation. It should be entirely mechanical, because electrical power may not be available on the rig during the daytime.

We have observed that, through use of existing equipment, the drillers are trained to disengage the recorders except when actually drilling; therefore, automatic disengagement is not a necessary feature upon the equipment.

An object of this invention is to provide a drilling recorder which records the drilling rate against the depth of the well.

Another object is to provide a recorder to record sundry data against well depth.

Another object of this invention is to indicate the drilling time required for a joint of drill stem.

Another object is to record time not spent drilling.

Another object is to provide a recorder wherein the cumulative time spent drilling is kept from the beginning of the well.

Another object is to provide a recorder wherein the cumulative depth of the well is indicated.

A further object is to provide a recorder wherein two scales are provided to correlate with other logs, namely 2 inches of paper per 100 feet of well depth and 5 inches per 100 feet of well depth.

A further object is to provide an indication of the down time wherein short down time is measured on an expanded scale, and longer down time is measured on a compressed scale.

Still further objects are to achieve the above with a device that is sturdy, compact, durable, simple, and reliable, yet inexpensive and easy to manufacture.

The specific nature of the invention, as well as other objects, uses, and advantages thereof, will clearly appear from the following description and from the accompanying drawings, the different views of which are not necessarily to the same scale, in which.

Figure 1:
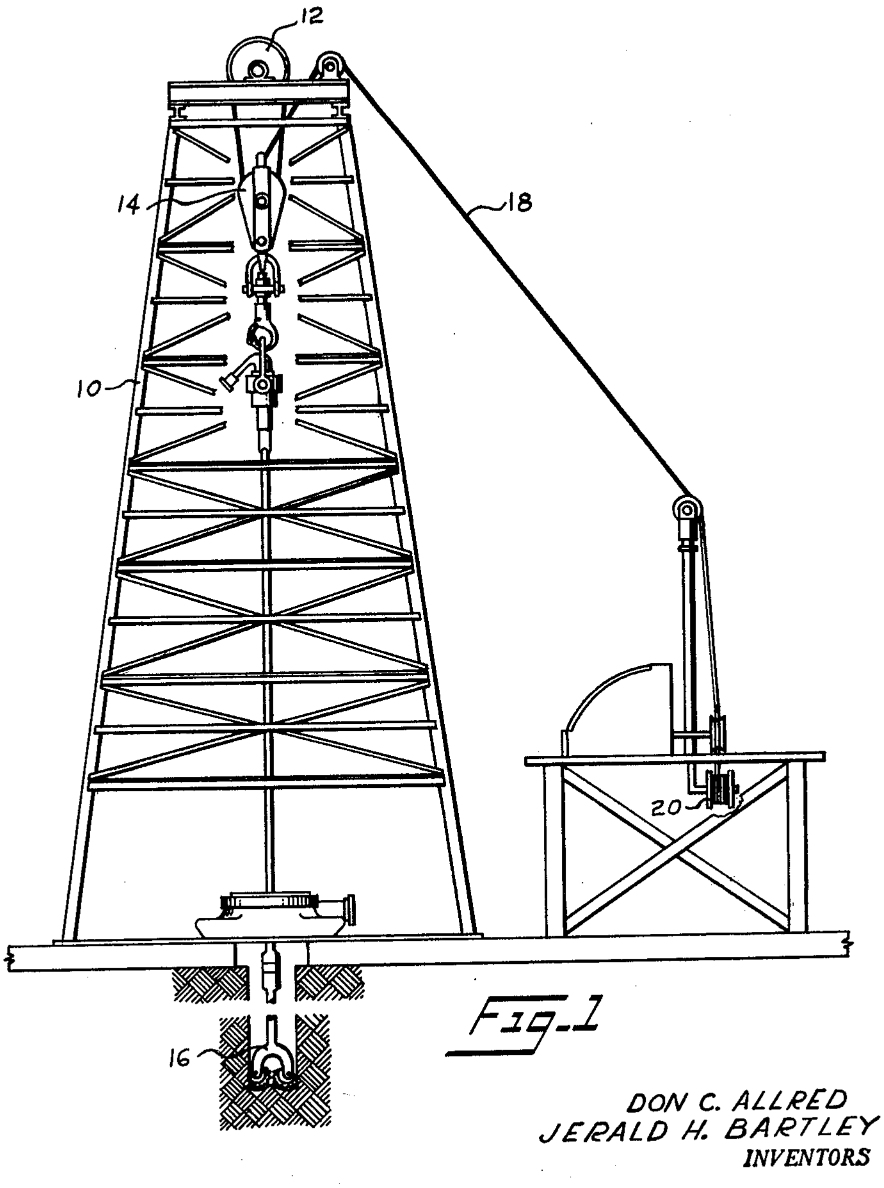
FIG. 1 is a schematic indication of a recorder according to this invention mounted on a drilling rig.

As may be seen in the accompanying drawings, this equipment is designed to be operated in conjunction with any oil well drilling rig of the rotary type.

As is conventional with this type rig, derrick 10 is provided with crown block 12 and travelling block 14. The drilling line is reeved between these blocks. Drill bit 16 is suspended from the travelling block 14 by various well-known elements. The movement of the travelling block 14 will be approximately the same as the movement of the drill bit 16. If the cumulative downward movement of the travelling block 14 is measured while drilling, the depth of the hole will be measured.

Flexible tension element or cable 18 is attached to the travelling block 14, reeved over convenient pulleys, and connected to windlass drum 20. The windlass drum 20 is rotated by spring tension. The above is standard procedure commercially made available upon the market.

Figure 2:
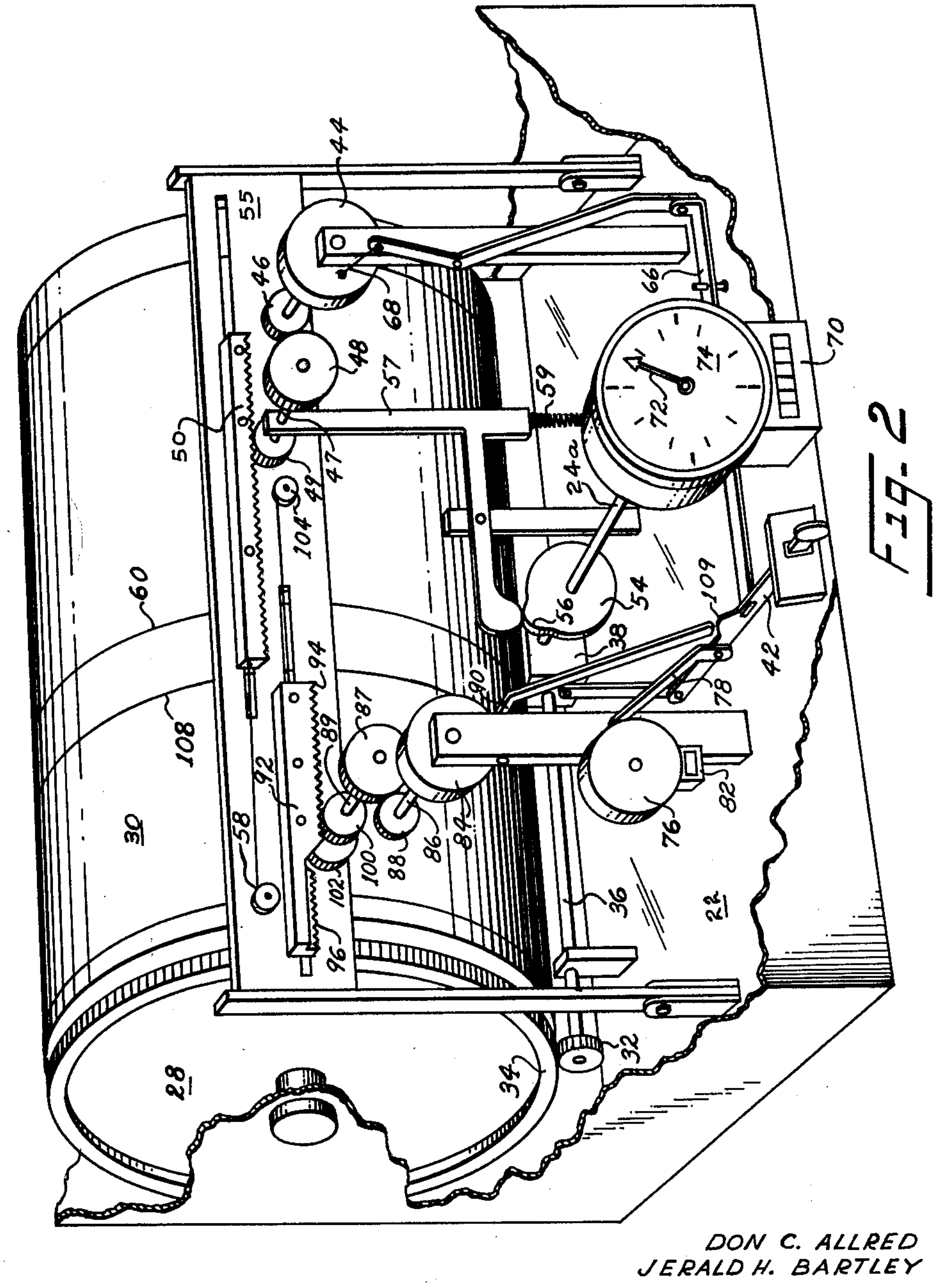
FIG. 2 is a perspective view, partially broken away, of a first embodiment of a recorder according to this invention.
Figures 3, 4, 5:
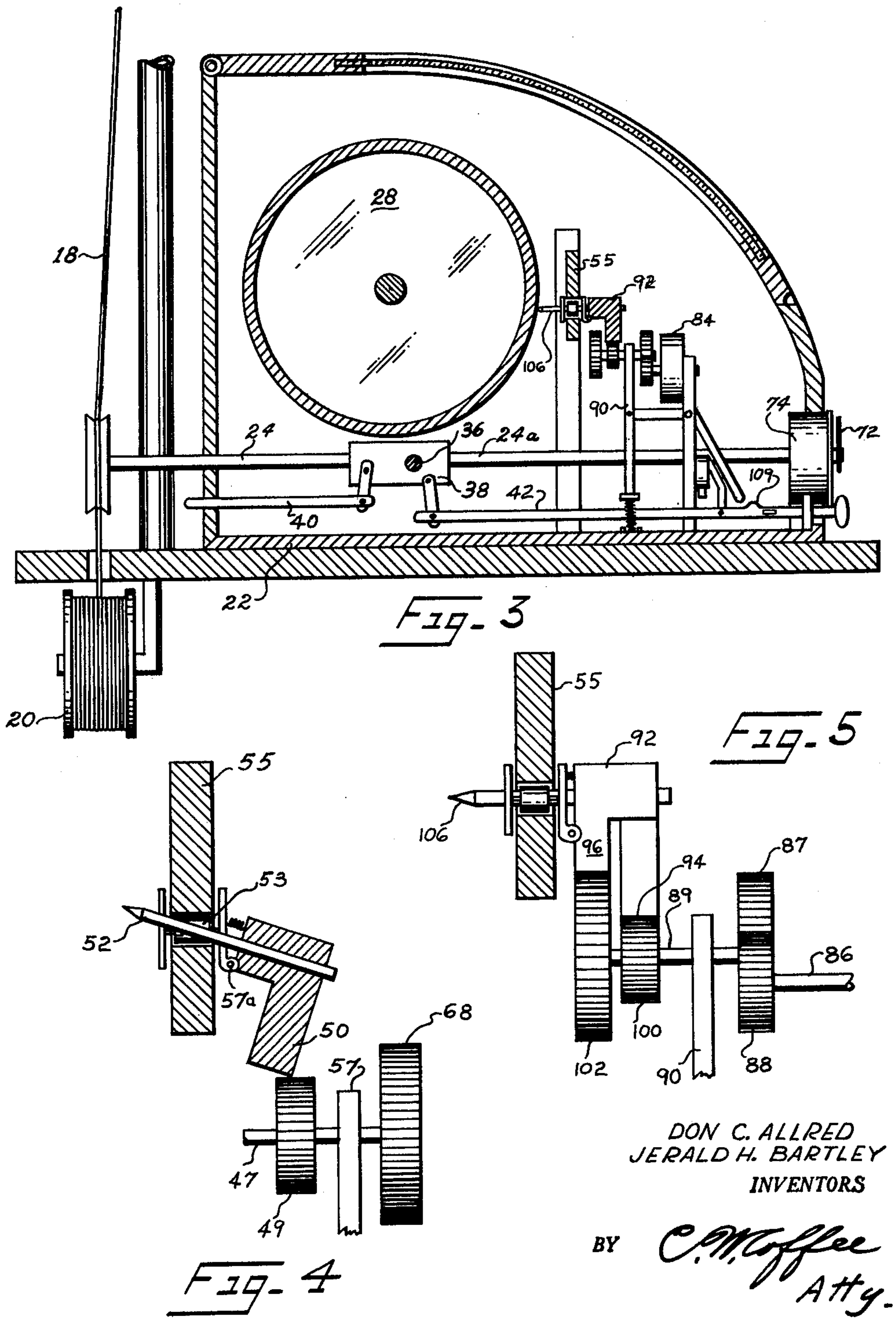
FIG. 3 is a cross sectional view of the recorder of FIG. 2.
FIG. 4 is a partial sectional view of the recorder according to FIG. 2 on an enlarged scale.
FIG. 5 is another partial sectional view of the recorder according to FIG. 2 on an enlarged scale.
Figure 6:
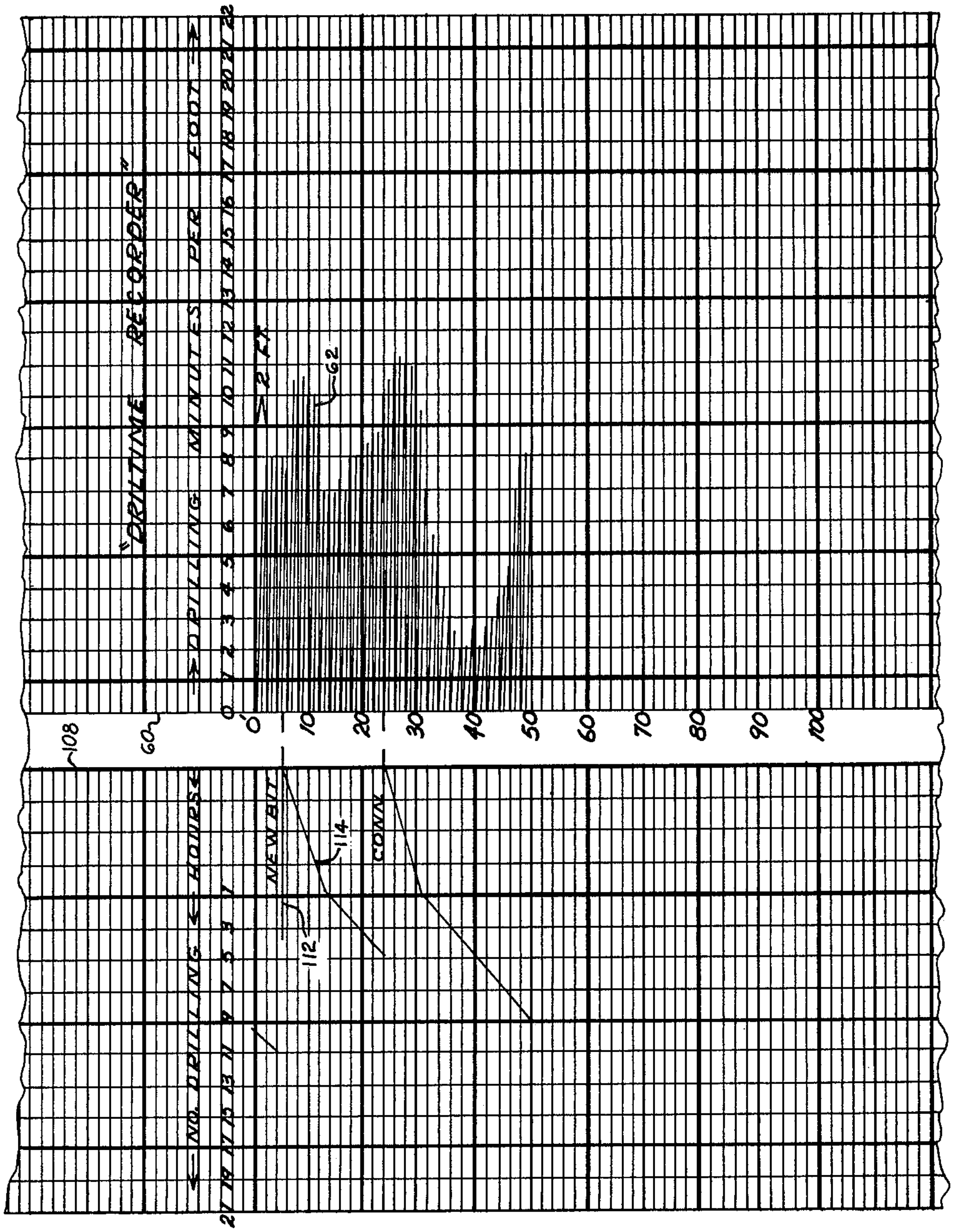
FIG. 6 is a representation of a chart that would be produced by the recorder of FIG. 2.
Figure 7:
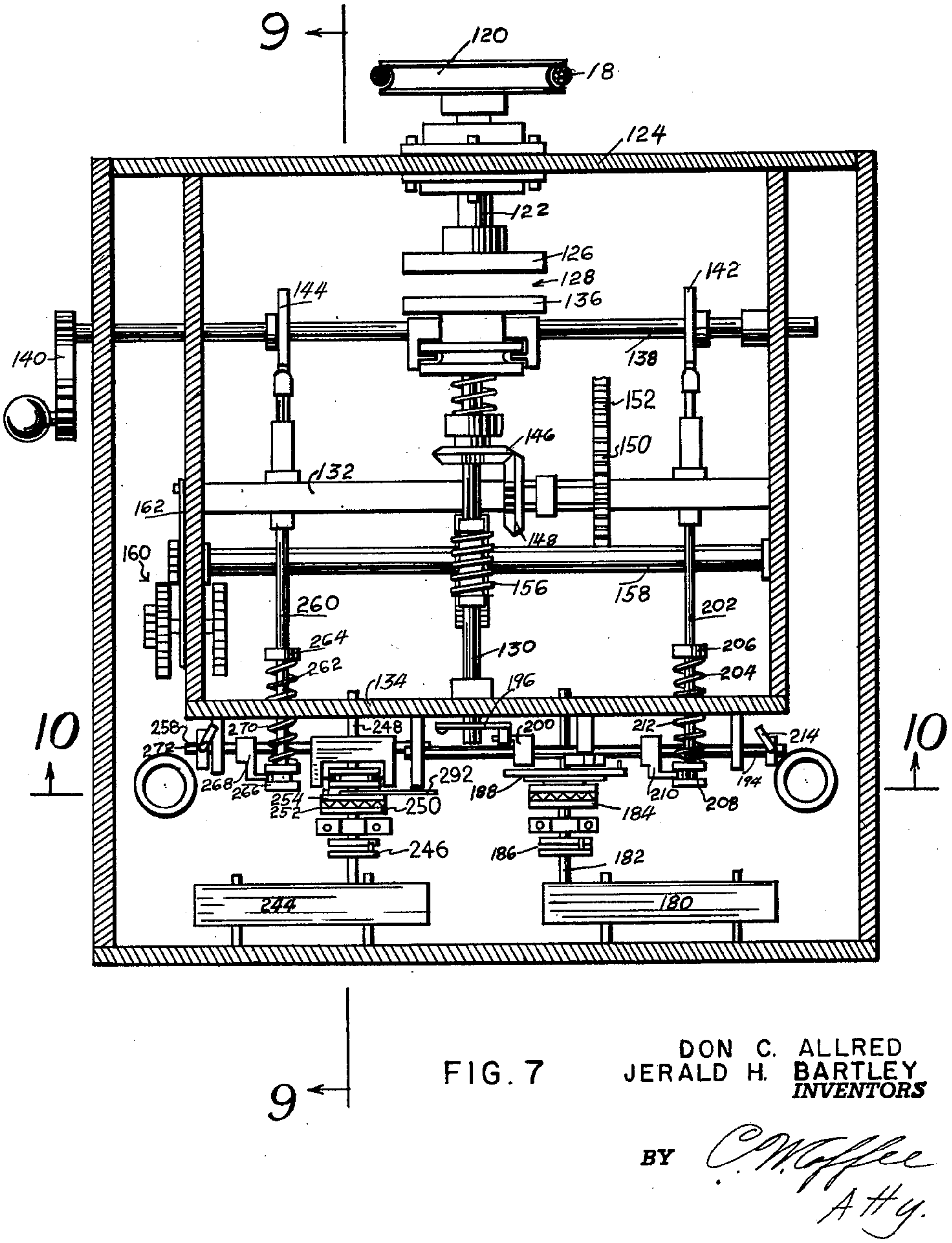
FIG. 7 is a top sectional view showing the mechanism of a second embodiment.

*Embodiment of FIG. 2*

Referring now more particularly to the embodiment illustrated in FIGS. 2–6, the equipment is contained in a unitary package which includes frame 22 attached at some convenient point of the drilling rig. The reel 20 and its associated spring are attached to the frame 22. Shaft 24 is mounted for rotation on the frame. One end of the shaft has a sheave with a circumference of one foot. The cable 18 wraps around the sheave as it extends from the system of pulleys to the windlass drum 20. Each time the drill bit moves one foot, the shaft 24 will rotate one revolution.

Drum or platen 28 is attached to the frame. Paper 30 is attached to the platen. The rate at which the paper passes along the platen is controlled by pinion 32 engaging gear 34 along one end of the drum. The pinion is mounted upon shaft 36 which is mounted for rotation upon the frame. Other types of paper recording systems are available. For example, there is a type with a plane surfaced stationary platen having a roll of paper at one end and a paper reel at the other. The rate the paper passes over the platen from the roll to the reel is governed by sprockets engaging perforations in the edge of the paper. In such a system, the shaft upon which the sprockets were mounted would correspond to shaft 36 of the instant system.

Gear box 38 connects the shaft 36 to the shaft 24. The gear box is constructed so that two ratios are available between the shaft 24 and 36. One of the ratios being for every 100 revolutions of shaft 24 that the shaft 36 shall revolve sufficiently to move the paper 5 inches. The other ratio will be that the paper moves 2 inches for every 100 feet of travel of the drill bit, i.e. every 100 revolutions of the shaft 24. As gear transmissions are well-known this will not be further discussed here except to note that it is controlled by level 40.

A clutch is within the transmission train between the shaft 24 and 36. The clutch is controlled by lever 42 also mounted upon the frame of the recorder. Movement of the lever in one direction disengages the clutch while movement in the opposite direction engages the clutch and, therefore, causes the shaft 36 to revolve when the shaft 24 is rotating. Thus, means for moving the paper at two rates of travel proportional to the drill bit movement are provided.

Clock 44 is mounted upon the frame. The clock is a spring wound timing means, it being undesirable to use an electrical timing means. The clock has an output shaft upon which a gear 46 is mounted. It engages gear 48 which is upon jack 47. Pinion 49 is also located upon the jack shaft engaging rack 50. The rack has a pen or stylus 52 attached thereto. Any type stylus conventionally used, may be used although we prefer to use a ball point pen for marking on the paper. The rack is mounted by rollers 53 to move relative to bar 55 which is attached to the frame 22. Hinge 57*a* attaches the rack to the frame which carries the rollers 53. A spring biases the rack in such a manner that if the pinion 49 is not engaged with the rack teeth 50 that the stylus 52 is removed from the surface of the paper.

The shaft 47 is mounted upon a crank arm 57. The crank arm is biased by spring 59 so that normally the pinion is engaged with the rack teeth 50; however, as will be explained later, means are provided for rotating the crank arm so that the pinion 49 disengages the rack teeth 50.

Disc 54 is mounted on shaft 24 to rotate therewith. The disc has a projection or protuberance 56 mounted thereon. Crank arm 57 is spring biased so that the pinion is engaged with the rack. The crank arm rides against the disc 54 so that for every revolution of the shaft 24 the protuberance will strike the crank arm and move it downward against the spring tension that is removing the pinion from the rack. The rack 50 is biased by spring 58 so that the pen tends to return to zero indice 50 upon the paper. Therefore, it may be seen that the distance of line 62 extending outward from the zero indice will be proportional to the length of time required for the drill bit to travel one foot.

The lever 42 has a motion bifurcation 66 to operate a stop element 68 upon clock 44. Therefore, when the lever is moved to the disengaged position of clutch, it at the same time stops the clock 44. Alternatively, the motion bifurcation could operate to rotate crank 57 to remove the pen 52 from the paper.

Counter 70 is attached to the frame and to shaft 24*a*. Shaft 24*a* turns at the same speed as shaft 24 but is disengaged by clutch lever 42. Therefore, for each revolution another digit appears on the counter. By this means the counter 70 will read the cumulative number of feet since it was last set to zero. Therefore, if the counter is set to zero when the well is on the surface, the counter will read the depth of the well in feet. Of course, it may be reset to a corrected depth. Pointer 72 is attached to the end of the shaft 24*a*. It operates in connection with a dial 72 so that a visual indication of the downward movement of the drill bit is had.

Second clock 76 is mounted upon the frame. Counter 82 is attached to this clock which counts upward to 200 hours. There is another bifurcation 78 upon the lever 42 which operates a stop mechanism on clock 76. Therefore, the clock 76 will operate whenever the clutch 40 is engaged. Therefore, if counter 82 which is operated by clock 76 is set to zero when the well commences drilling, the counter 82 will read the total number of hours which the well has been drilling since the beginning. Since clocks 44 and 76 run at the same time, they could be combined; however, we have found that clocks are cheaper than the gear mechanism.

Third clock 84 is also mounted upon the frame; the output shaft 86 has a gear 88 mounted thereon. Gear 87 is mounted upon jack shaft 89 and meshes with gear 88. The jack shaft 87 is rotatably mounted in crank 90 which is pivoted to the frame 22. Pen carrier 92 is mounted for reciprocation on bar 55. Racks 94 and 96 are upon the pen carrier 92. Pinions 100 and 102 are attached to jack shaft 87 and meshed individually with the racks. Pinion 100 is ¼ the diameter of pinion 102 so that its peripheral speed is ¼ as much. Therefore, the rack 94 must have a flange to bring it into engagement with the pinion 100. As seen on the drawings, the racks are not continuous upon the pen carrier. The rack 96 extends for approximately the first one inch of travel, then it is discontinued with the rack 94 starting with that point. Therefore, for the first inch of travel, the pen carrier 92 will be driven one rate of travel; and for the remainder of its travel, it will be driven ¼ as fast. The pen bar also has spring 104 to return the pen or stylus 102 to the zero indicium 108. The forked lever 42 has a protuberance or dog 109 on it adjacent to the crank 90. The relationship is that whenever the lever is moved from the on to the off position, the dog passes under the crank arm, therefore, causing it to rotate. Also, when the lever is moved in the reverse, from the disengaged to the engaged position, the dog passes under the lever arm causing the pen to fly back to zero. Therefore, it may be seen that the pen 106 will make either line 112 or line 114 upon the chart. After the clutch has been disengaged, the pen 106 flies back to the zero indicium 108 so that, with the paper not travelling, the pen will draw a straight line for the amount of time the well is not drilling. Then, when the lever is moved to engage the clutch, line 114 will be produced. It will angle across the paper because of the combined movement of the paper and the pen. It will measure the time of continuous drilling which will ordinarily be a joint and, therefore, will give an indication of the time required to drill 30 feet, generally the length of drill stem joints used.

Of course, other pens or stylus may be connected to the bar 55 to give an indication of other drilling data. Other drilling data that might be desirable to record would be the drilling mud pressure, drilling mud volume, drill bit pressure, rotational speed of the drill bit, etc.

From the above, it will be understood that all the operator has to do is to wind the clocks periodically and operate the lever 42 each time the bit touches bottom and each time the bit is removed from the bottom. All of the clocks are spring wound clocks and have conventional winding keys.

*Embodiment of FIGS. 7–11*

Referring now to the embodiment shown in FIGS. 7–11, it will be noted that this embodiment, likewise, has a sheave 120 about which the flexible tension element 18 is wrapped. The sheave is connected to shaft 122 which is journaled through the back wall 124 of the housing of the equipment. The shaft 122 terminates with one disc 126 of friction clutch 128. The other face of the friction clutch is connected to clutch shaft 130 which is journaled through plate 132 and intermediate frontwall 134. The movable disc 136 of the friction clutch 128 is actuated by engagement shaft 138. The engagement shaft is operated by lever 140 which is conveniently located on the outside of the equipment. The engagement shaft 138 also has located thereon cams 142 and 144, the function of which will be explained later.

The shaft 130 carries thereon beveled gear 146 which is meshed with beveled gear 148 on a jack shaft. The jack shaft is journaled onto plate 132. The jack shaft, likewise, carries a sprocket 150 which drives chain 152 which is trained over a pair of idler pulleys and ultimately drives counter 154.

Therefore, it may be seen that, if the friction clutch 128 is engaged for each revolution of the shaft 130, the counter 154 will register one additional unit, because the drive is on a one-to-one ratio.

Figure 9:
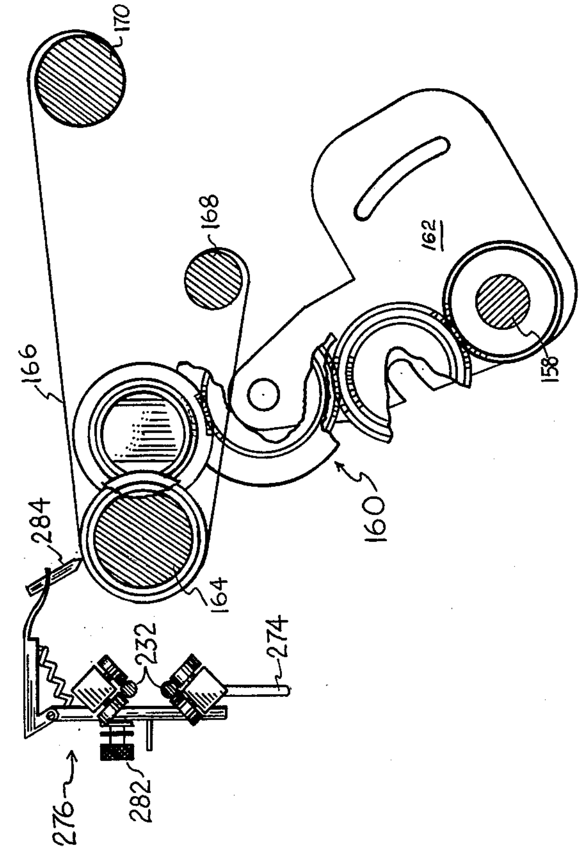
FIG. 9 is a sectional view taken substantially on line 9—9 of FIG. 7, however, omitting the structural support for the moving elements and also omitting the down time recording mechanism for clarity.

Worm 156 is also located on shaft 130. It drives a worm wheel mounted on shaft 158 which in turn drives the gear train 160. The gear train 160 includes the gears mounted upon plate 162 which is locked in the operating position. The plate may be rotated out of operating position, and certain gears may be shifted from one position to the other so as to obtain different rates of travel upon roller 164 which is driven by the gear train 160. The roller 164 may be driven by the gear train 160 so that the periphery of the roller 164 travels two inches for each 100 revolutions of shaft 130, or it may be geared so that the periphery of the roller 164 travels 5 inches for each 100 revolutions of shaft 130. Thus, the travel of the roller 164 is such that paper 166 carried by the roller 164 may be correlated in movement to the standard logs made by electrical logging systems after the well is completed (FIG. 9).

The roller 164 is part of a standard paper system. This standard system includes a reel of paper 168, the paper threading off the reel around the perimeter of the roller 164 and along to the take-up roll 170. The take-up roll 170 is driven by resilient belt 172 so that there is always tension upon the take-up roll 170. However, there is sufficient slippage so that it does not tear the paper 166. Also, the roller 164 is provided with a hand-knob 174 so that the roller 164 may be rotated manually. There is a slip clutch (not shown) between the gear train 160 and the roller 164 so that it may be advanced manually.

Time rate clock 180 is attached to the front wall of the equipment. A hole (not shown) is provided through the front wall so that the clock may be wound. Output shaft 182 of the clock is attached to clutch 184.

The shaft 182 includes coupling 186 so that the clock may be easily removed and replaced without disrupting the rest of the mechanism. Reel 188 is attached to the other half of the toothed clutch 184. The reel has three sheaves of different diameter so that cord 190 may be attached to any one of the three sheaves. Upon rotation of the shaft 182, the cord is driven at any one of three selected speeds. The reel 188, as well as half of the toothed clutch 184, is mounted for movement upon the shaft 182 so that it may be operated by lever 192 which is attached to time rate clutch shaft 194. The time rate clutch shaft 194 may be rotated by ony one of three mechanisms. One is the foot mark mechanism.

The shaft 130 extends on through the intermediate front wall 134 and terminates with disc 196. The disc has protrusion 198 on the front thereof which cooperates with lever 200 which projects from the clutch shaft 194. Therefore, it may be seen that upon each revolution of the shaft 130, the protrusion will rock the lever 200 causing some slight rotation of shaft 194 which will also cause slight rotation or rocking of the lever 192 disengaging clutch 194.

Figure 8:
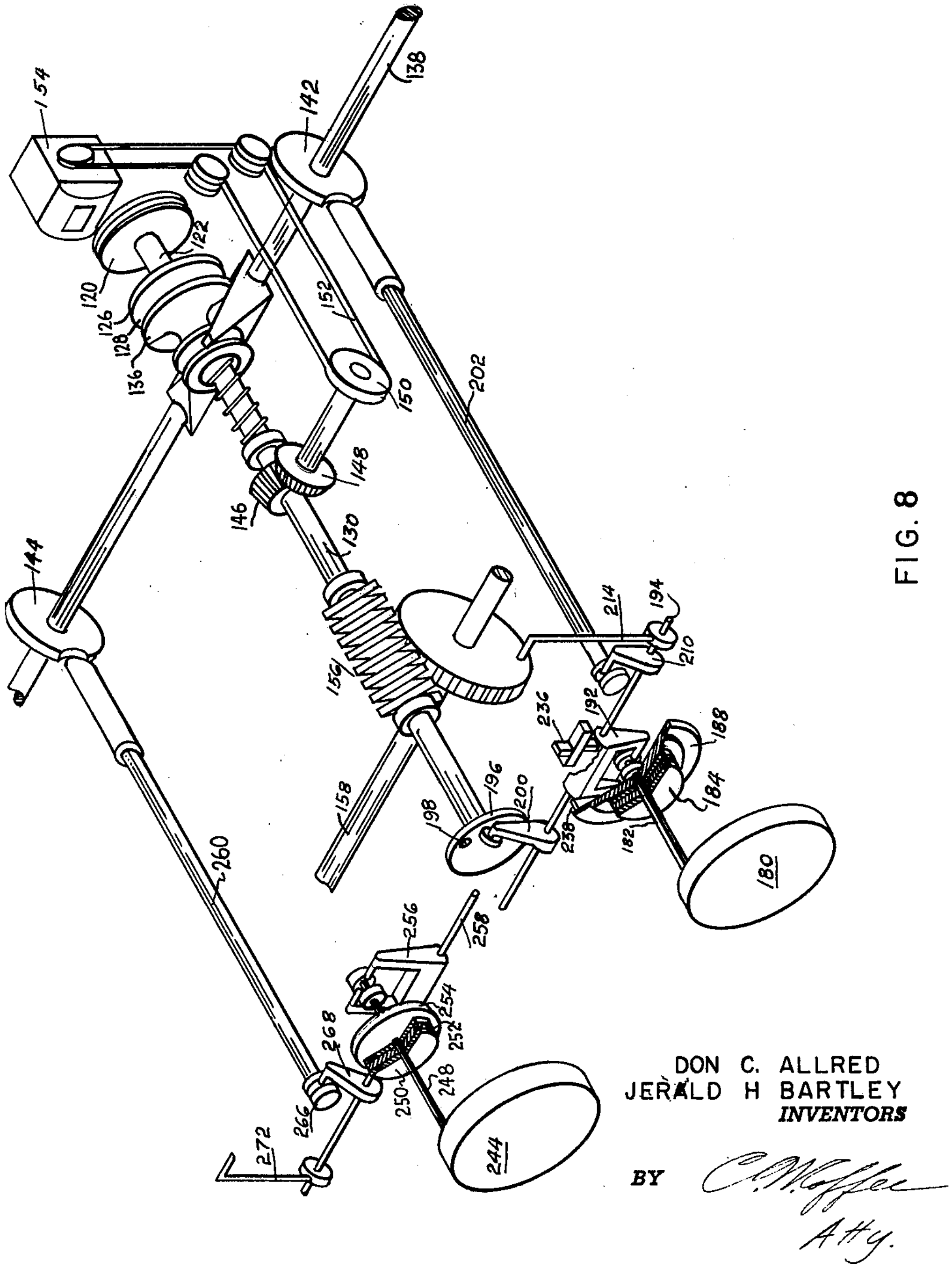
FIG. 8 is a perspective of the embodiment of FIG. 7 showing some of the principal mechanism, but not showing the frame work by which the moving elements are mounted.

Another method of rocking or rotating clutch shaft 194 is by disengagement cam 142. When the friction clutch 128 is disengaged by rotation of the shaft 138, it causes a depression in cam 142 to become aligned with pusher rod 202 which is mounted for translational movement within the plate 132 and the intermediate front wall 134. Spring 204 operates between intermediate front wall 134 and collar 206 upon pusher rod 202. Therefore, the end of the rod 202 is always pressed firmly against the cam 142. A stop 208 on the end of pusher shaft 202 actuates lever 210 which is connected to clutch shaft 194. Lever 210 is normally spring biased in a clockwise position as seen in FIG. 8 by spring 212; therefore, in a normal position, the elements of clutch 184 are held in engagement. However, the spring 204 is stronger than the spring 212; and, therefore, when the shaft 138 is rotated so that the depression in cam 142 is aligned with pusher rod 202, the pusher rod moves to the right as seen in FIG. 8 thus rocking lever 210 and, subsequently, disengaging clutch 184.

Carriage lever 214 is also secured to the clutch shaft 194 and carries a cam surface on the extreme end. Therefore, when time rate scriber carriage 216 reaches the end of its travel, projection 218 from time rate scriber carriage 216 actuates lever 214 (FIG. 10).

Therefore, if the carriage 216 reaches the end of its travel without the clutch shaft 194 being actuated by the lever 200 or lever 210, the lever 214 will rock it sufficiently to disengage the clutch 184.

Figure 10:
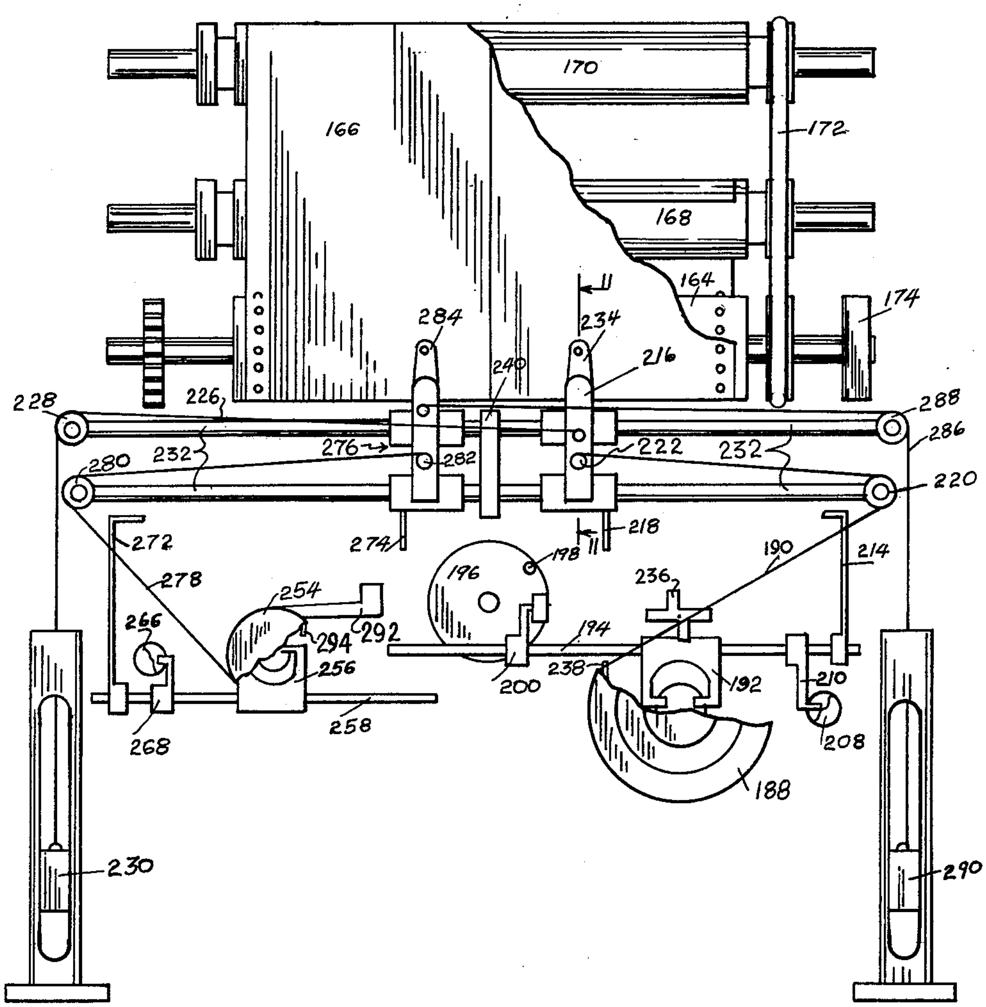
FIG. 10 is a sectional view taken substantially on line 10—10 of FIG. 7 also omitting the structural supports from the various moving elements and also omitting certain parts for clarity.
Figure 11:
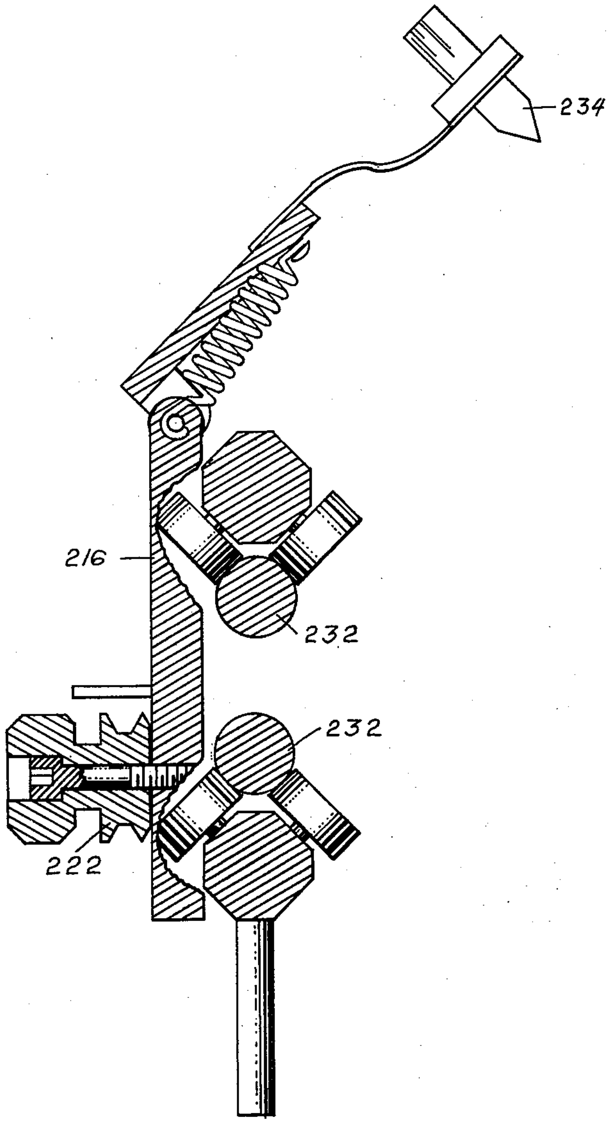
FIG. 11 is a sectional detail of the carriage taken on line 11—11 of FIG. 10.

As previously stated, the cord 190 is reeved around one of the three sheaves of reel 188 (FIG. 10). It extends around pulley 220 and is attached to the carriage 216. The attachment is to reel 222 which is locked in place by set screw 224 (FIG. 11). Cord 226 is also attached to carriage 216. The cord 226 extends over pulley 228 and terminates with weight 230. The carriage is mounted for translational movement along track 232 which extends parallel to the axis of roller 164. The carriage carries spring biased stylus 234 which is pressed against the paper 166. Of course, it will be understood that this stylus 234 an be any type of writing instrument, either carrying ink or it can be merely a sharp pointed instrument which operates against pressure sensitive paper 166.

Thus, it may be seen that, if the toothed clutch 184 is engaged, the cord 190 will pull the time rate scriber carriage 216 and thus stylus 234 across the paper lifting the weight 230. However, should the clutch shaft 194 be rotated so that toothed clutch 184 is not engaged, then the weight 230, acting through cord 226, pulls the carriage 216 back to the zero position.

Star wheel 236 is mounted for rotation upon the front of the intermediate front wall 134. The star wheel 236 cooperates with a stop projecting from the front wall so that it is limited in rotation to less than one-half revolution. The stop from the front wall interferes with its rotation. Likewise, stop pin 238 projects from the back of reel 188 against the star wheel 236. As may be seen in FIG. 10, the clock 180 will drive the reel in a counter-clockwise direction. Therefore, if the reel makes more than one revolution, the stop pin 238 will rotate the star wheel 236 a fraction of a revolution. However, when the clutch 184 is disengaged, the stop pin 238 rotates the star wheel 236 back to its original position so that the reel 188 returns to a zero position each time the clutch 184 is disengaged for sufficient time for the rotation of the reel 188. As the cord 190 is inelastic, this will cause the stylus 234 to return to a zero position each time.

Brace 240 is located at the middle of the track 232. When the carriage 216 flies back to the zero position, it may come to rest against the brace 240. However, if so, it is necessary that, in the zero position, the cord 190 be taut so that when the clutch 184 is again engaged, carriage 216 begins movement immediately without having to take slack from cord 190. Therefore, it will be necessary to adjust the reel 222 upon the time rate scriber carriage 216 each time the cord is moved from one sheave to another upon reel 188. If the cord 190 is moved from one sheave to another at reel 188, each being a different diameter, this will cause the carriage 216 to progress across the paper at different time rates.

Down time clock 244 is attached to the front wall of the equipment. It, likewise, has a hole through the front of the equipment so that the clock 244 may be wound. Also, the output shaft has a coupling 246 attached thereto so that the clock 244 may be replaced readily without disturbing the rest of the mechanism. The output coupling 246 is attached to shaft 248 which is attached to disc 250 of clutch 252. The other disc of the clutch 252 carries down time reel 254. The down time reel 254 with its one-half of clutch disc is likewise mounted for translational movement upon the shaft 248 and is actuated by lever 256 which is mounted upon down time clutch shaft 258. The down time clutch shaft 258 may be actuated by pusher rod 260 which is biased by spring 262 against cam 144. The spring 262 operates between front intermediate wall 134 and collar 264 on the pusher rod 260. Cam 144 has a depression in its surface so that as the shaft 138 is rotated to either position, the pusher rod 260 will move to the right as seen in FIG. 8. This movement to the right will act through stop 266 on the end of pusher rod 260 to rock lever 268 which is carried by the clutch shaft 258. The clutch shaft 258 is normally rotated to the engaged position by spring 270 operating against the intermediate wall 134 and lever 268.

Clutch shaft 258 may also be rocked by lever 272 which has an angle surface on its upper end adapted to be moved by the pending projection 274 carried by down time carriage 276. Therefore, when the carriage 276 reaches the end of its travel, the projection 274 will strike the end of the lever 272 and, therefore, rock shaft 258, disengaging the down time clutch 252. Cord 278 is trained over the down time reel 254 and around pulley 280 and attached to the carriage 276 by reel 282. Carriage 276 operates upon track 232 on the other side of the middle brace 240. It, likewise, carries spring biased stylus 284 which is adapted to make a mark upon the paper 166. Cord 286 is attached to the carriage 276 and extends over pulley 288 and is attached to weight 290 so as to return the carriage 276 to the zero position any time the clutch 252 is disengaged.

The cams 142 and 144 are timed so that in either instance, when the clutch 128 is engaged, the pusher rods 202 and 260 are in a position to have the clutches 184 and 252 also engaged. However, when the lever 140 is rotated to the disengaged position, thus disengaging the clutch 128, the pusher rod 202 is in the depression of cam 142, thus, disengaging clutch 184. That is to say that when the rig is not drilling, the lever 140 will be moved to the disengaged position; and, therefore, the drill rate timer clock 180 will not be engaged. However, the depression in cam 144 is such that when the lever 140 is either in the engaged or disengaged position, the rod 260 is not under depression; and therefore, the clutch 252 is engaged so that the down time recorder records. Midway between the engaged and disengaged position, the pusher rod 260 fits within the depression of the cam 144 so as to disengage clutch 252 at this time. Therefore, when the equipment is drilling the stylus 284 will record the joint time, that is to say the time necessary to drill one joint of drill stem. However, when the equipment is not drilling and the lever 140 is in the disengaged position, the stylus 284 will record the down time or the time the well is not drilling.

Lever 292 is pivoted from the intermediate front wall 134. The end of the lever 292 intersects stop 294 on the reel 254 so as to stop the carriage 276. The operation is similar to the operation of star 236 stopping carriage 216.

It will be apparent that certain modifications can be made; for example, the down time reel 254 does not necessarily have to be a circular reel. That is to say, if the outside configuration of this reel were made in a spiral the stylus 284 would not move in any constant time rate. The purpose of such a configuration is so that the stylus would move faster at the begining of down time than it did at the end of the down time so that short down time could be measured within the accuracy of three or four minutes whereas long down time could be measured within an accuracy of an hour or two. Yet, the stylus could run for, say, twenty-four hours before it reached the lever 272 which would stop further progress.

It will be apparent that the embodiments shown are only exemplary and that various modifications can be made in construction, materials, and arrangement within the scope of the invention as defined in the appended claims.

We claim as our invention:

1. In a drilling rate recorder for a drilling rig having a drill bit operated below the surface of the earth, the drill bit suspended from a travelling block mounted for vertical movement, the improvement comprising:
(*a*) a frame,
(*b*) a platen on the frame,
(*c*) paper on the platen mounted for movement,
(*d*) a zero indicium on the paper,
(*e*) means for moving the paper responsive to movement of the travelling block,
(*f*) a lever,
(*g*) movement of said lever in first direction activating the means for moving the paper,
(*h*) movement of said lever in a second direction deactivating the means for moving the paper,
(*i*) a stylus mounted on the frame for marking on the paper,
(*j*) a clock,
(*k*) means for moving the stylus transverse to the direction of the paper travel responsive to the clock,
(*l*) means for resetting the stylus to the zero indicium each time the lever is moved in said first direction to activate the means for moving the paper, and
(*m*) means to reset said stylus to the zero indicium each time the lever is moved in said second direction to deactivate the means for moving the paper.

2. In a drilling rate recorder for a drilling rig having a drill bit operated below the surface of the earth, the drill bit suspended from a travelling block mounted for vertical movement, the improvement comprising:
(*a*) a frame,
(*b*) a platen on the frame,
(*c*) paper on the platen mounted for movement,
(*d*) a zero indicium on the paper,
(*e*) means for moving the paper responsive to movement of the travelling block,
(*f*) a lever,
(*g*) movement of said lever activating and deactivating the means for moving the paper,
(*h*) a stylus mounted on the frame for marking the paper,
(*i*) a first clock,
(*j*) means for moving the stylus transverse to the direction of the paper travel responsive to the clock,
(*k*) means for resetting the stylus to zero indicium each time the lever is moved to deactivate the means for paper travel,
(*l*) a second zero indicium upon the paper,
(*m*) a second stylus mounted on the frame for marking on the paper,
(*n*) a second clock,
(*o*) means for moving the second stylus transverse to the direction of the paper travel responsive to the second clock, and
(*p*) said lever also being the means for deactivating the second clock.

3. The invention as defined in claim 2 with the addition of means for resetting the first stylus to the zero indicium for a predetermined amount of movement of the travelling block.

4. In a drilling rate recorder for a drilling rig having a drill bit operated below the surface of the earth, the drill bit suspended from a travelling block mounted for vertical movement, the improvement comprising:
(*a*) a frame,
(*b*) a platen on the frame,
(*c*) paper on the platen mounted for movement,
(*d*) means for moving the paper responsive to movement of the travelling block,
(*e*) a lever, (*f*) movement of said lever in a second direction deactivating the means for moving the paper,
(*g*) a stylus mounted on the frame for movement transverse to the direction of the paper travel for marking on the paper,
(*h*) means for moving the stylus at a predetermined time rate,
(*i*) means for resetting the stylus to an original position each time the lever is moved to deactivate the means for paper travel,
(*j*) means for resetting the stylus to the original position each time the lever is moved to activate the paper travel,
(*k*) a second stylus mounted for movement transverse to the direction of paper travel for marking on the paper,
(*l*) means for moving said second stylus at a predetermined time rate,
(*m*) means for resetting said second stylus to an original position each time the lever is moved to deactivate the means for paper travel,
(*n*) said means for deactivating the paper travel, also being means for deactivating said second stylus, and
(*o*) means for resetting the second stylus to an original position each time the travelling block moves a predetermined distance.

5. The invention as defined in claim 4 with the addition of: a gear transmission within the means for moving the paper so that one of a plurality of ratios of paper travel to travelling block may be chosen, thus, producing a chart which may be directly correlated with other charts of the well produced by the drill bit.

6. In a drill rate recorder for a drilling rig having a drill bit operated below the surface of the earth, the drill bit suspended from a travelling block mounted for vertical movement, the improvement comprising:
(*a*) a frame,
(*b*) a platen on the frame,
(*c*) paper on the said platen mounted for movement,
(*d*) a sheave mounted for rotation on said frame,
(*e*) a flexible tension element attached to said travelling block,
(*f*) said tension element extending around said sheave, so that movement of said travelling block rotates said sheave,
(*g*) means for moving said paper responsive to rotation of said sheave,
(*h*) a stylus mounted for movement on said frame transverse to said paper movement,
(*i*) said stylus for marking on said paper,
(*j*) a clock mounted on said frame,
(*k*) means for moving said stylus along said paper responsive to said clock,
(*l*) a clutch between said clock and means for driving said stylus so that clock may be disengaged from said stylus,
(*m*) means for moving said stylus to an original position when the clutch is disengaged,
(*n*) a shaft mounted on said frame,
(*o*) rotation of said shaft disengaging said clutch,
(*p*) said shaft having three levers thereon, so that rotation of any of the three levers disengages said clutch,
(*q*) a cam surface connected to said sheave so that engagement of said cam surface against one of said levers rotates said shaft,
(*r*) means connected to said stylus for moving a second lever thus disengaging said clutch when the stylus reaches the full limit of its travel,
(*s*) means for disengaging said sheave from said means for moving said paper, and
(*t*) said means for disengaging also the means for rotating the third lever.

7. The invention as defined in claim 6 wherein
(*u*) the stylus is mounted on a carriage,
(*v*) a cord is attached to the carriage and reeved to a reel,
(*w*) said reel being driven by said clock through said clutch, and
(*x*) said reel having sheaves of three diameters thereon so that the stylus may be driven at three predetermined speeds.

8. The invention as defined in claim 6 with the addition of
(*u*) a second clock attached to the frame,
(*v*) a reel driven by said second clock,
(*w*) a second clutch between the second clock and the reel,
(*x*) said second clutch being disengaged by rotation of a second shaft,
(*y*) a second stylus mounted for movement on the paper transverse to the paper travel,
(*z*) said second stylus being moved by a cord attached to said second reel,
(*aa*) means attached to said second stylus for rotating said second shaft to disengage said second clutch, and
(*bb*) said means for disengaging said sheave from said means for moving said paper also being means for rotating said shaft.

9. In a drilling rate recorder for a drilling rig having a drill bit operating below the surface of the earth, the drill bit suspended from a travelling block mounted for vertical movement, the improvement comprising:
(*a*) a frame,
(*b*) a sheave mounted for rotation on said frame,
(*c*) a flexible tension element connected to said travelling block and extending around said sheave so that movement of the travelling block rotates the sheave,
(*d*) a clutch shaft rotated by said sheave,
(*e*) a clutch for disengaging the sheave from the clutch shaft,
(*f*) an engagement shaft for engaging and disengaging the sheave from the clutch shaft,
(*g*) a handle for rotating said engagement shaft,
(*h*) a platen mounted on said frame,
(*i*) paper upon said platen mounted for movement,
(*j*) gearing between said paper and said clutch shaft for moving said paper responsive to rotation of said clutch shaft,
(*k*) a track mounted on the frame adjacent to said paper,
(*l*) a time rate scriber carriage mounted for movement on said track,
(*m*) a down time scriber carriage mounted for movement on said track,
(*n*) said track extending transverse to direction of paper travel, so that said carriages move transverse to said paper travel,
(*o*) a time rate clock mounted on said frame,
(*p*) a time rate reel driven by said time rate clock,
(*q*) a time rate clutch between said clock and said reel to disengage the reel from the clock,
(*r*) a cord wrapped around said time rate reel and attached to said time rate scriber carriage,
(*s*) a down time clock mounted on said frame,
(*t*) a down time reel attached to said down time clock,
(*u*) a down time clutch between said down time reel and said down time clock,
(*v*) a cord attaching said down time reel to down time scriber carriage,
(*w*) a cam on said engagement shaft,
(*x*) means interconnecting said time rate clutch and said cam for disengaging said time rate clutch,
(*y*) a second cam on the said engagement shaft,
(*z*) means interconnecting said second cam and said down time clutch for disengaging said down time clutch responsive to the position of said second cam,
(*aa*) a projection from said time rate scriber carriage,
(*bb*) means for interconnecting said projection and said time rate clutch for disengaging said time rate clutch when said time rate scriber carriage is in an extreme position of travel, (*cc*) a projection from said down time scriber carriage, (*dd*) means for connecting said projection on the down time carriage and down time clutch for disconnecting the down time clutch when the down time carriage reaches the extreme limit of its travel, (*ee*) a cam on said clutch shaft, and (*ff*) means for interconnecting said time rate clutch and said cam on said clutch shaft for disengaging said time rate clutch responsive to movement of said cam.

10. The invention as defined in claim 9, wherein said time rate reel has three sheaves thereon so that said cord connecting the time rate reel and the time rate carriage may be driven at any one of three predetermined speeds.

11. The invention as defined in claim 9, wherein said gearing between said clutch shaft and said paper is such that the paper may be driven at two selective speeds relative to the clutch shaft rotation.

References Cited in the file of this patent

UNITED STATES PATENTS

| | | |
|---|---|---|
| 2,390,178 | Rutherford | Dec. 4, 1945 |
| 2,831,347 | Yancey | Apr. 22, 1958 |
| 2,860,509 | Phillips | Nov. 18, 1958 |
| 2,883,256 | Nichols | Apr. 21, 1959 |
| 2,935,871 | Pearson | May 10, 1960 |
| 2,974,523 | Bendar | Mar. 14, 1961 |
| 2,981,102 | Melton | Apr. 25, 1961 |